United States Patent
Lin et al.

(10) Patent No.: US 11,426,880 B2
(45) Date of Patent: Aug. 30, 2022

(54) SOFT GRIPPER WITH MULTIZONE CONTROL TO ALLOW INDIVIDUAL JOINT ARTICULATION

(71) Applicant: KLA Corporation, Milpitas, CA (US)

(72) Inventors: Mark Lin, San Jose, CA (US); Ben Clarke, Milpitas, CA (US)

(73) Assignee: KLA Corporation, Milpitas, CA (US)

( * ) Notice: Subject to any disclaimer, the term of this patent is extended or adjusted under 35 U.S.C. 154(b) by 270 days.

(21) Appl. No.: 16/682,600

(22) Filed: Nov. 13, 2019

(65) Prior Publication Data
US 2020/0156261 A1 May 21, 2020

Related U.S. Application Data

(60) Provisional application No. 62/902,755, filed on Sep. 19, 2019, provisional application No. 62/770,663, filed on Nov. 21, 2018.

(51) Int. Cl.
*B25J 15/00* (2006.01)
*B25J 15/06* (2006.01)
*B25J 15/12* (2006.01)

(52) U.S. Cl.
CPC ....... *B25J 15/0023* (2013.01); *B25J 15/0616* (2013.01); *B25J 15/12* (2013.01)

(58) Field of Classification Search
CPC .... B25J 15/0023; B25J 15/0616; B25J 15/12; B25J 15/10
See application file for complete search history.

(56) References Cited

U.S. PATENT DOCUMENTS

| | | | |
|---|---|---|---|
| 3,343,864 A | 9/1967 | Baer | |
| 4,815,782 A * | 3/1989 | Craig | B25J 15/12 294/119.3 |
| 10,093,023 B2 | 10/2018 | Lessing et al. | |
| 10,189,168 B2 * | 1/2019 | Lessing | B25J 15/10 |
| 2003/0110938 A1 * | 6/2003 | Seto | B25J 9/142 92/92 |
| 2016/0075036 A1 * | 3/2016 | Lessing | B25J 15/0085 361/234 |
| 2016/0136820 A1 * | 5/2016 | Lessing | B25J 15/12 294/208 |
| 2016/0375590 A1 * | 12/2016 | Lessing | B25J 15/12 294/196 |

* cited by examiner

*Primary Examiner* — Stephen A Vu
(74) *Attorney, Agent, or Firm* — Suiter Swantz pc llo

(57) ABSTRACT

A gripper assembly is disclosed. The gripper assembly includes a stage, a mounting platform, and a plurality of the flexible gripper elements. The flexible gripper element is configured to grip an object. The flexible gripper elements are supported by a first end piece, where the first end piece is attached to the mounting platform. The mounting platform is connected to the stage, where the stage is moveable. The flexible gripper element includes a hollow section that is selectively pressurizable. The hollow section includes one or more zones, where each zone includes chambers which are pressurizable by a fluid input. The selective pressurization of the hollow section allows the flexible gripper element to grip the object.

42 Claims, 13 Drawing Sheets

SOFT GRIPPER WITH MULTIZONE CONTROL TO ALLOW INDIVIDUAL JOINT ARTICULATION

CROSS-REFERENCE TO RELATED APPLICATION

The present application claims the benefit under 35 U.S.C. § 119(e) of U.S. Provisional Application Ser. No. 62/770,663, filed Nov. 21, 2018, and U.S. Provisional Application Ser. No. 62/902,755, filed Sep. 19, 2019, which are incorporated herein by reference in their entirety.

TECHNICAL FIELD

The present invention generally relates to a device for gripping material or objects, and more particularly to a soft gripper element.

BACKGROUND

Robotic systems have been deployed in a variety of areas to automate actions otherwise performed by human labor for reasons such as consistency, speed, and continuous production. Such robotic systems often use end effectors to simulate or reproduce motion akin to that found in the human hand and fingers. Such humanlike motion may be desirable to grasp and move objects. In some cases, the robotic end effectors may be suitable for objects of a given dimension and material texture. However, such robotic end effectors may have difficulty adapting to objects of differing dimensions and material types.

Therefore, it would be advantageous to provide a system and method that cures the shortcomings described above.

SUMMARY

A flexible gripper element is disclosed in accordance with one or more illustrative embodiments of the present disclosure. In one illustrative embodiment, the element includes a hollow section. In another illustrative embodiment, the element includes a first end piece disposed at a first end portion of the hollow section. In another illustrative embodiment, the element includes a second end piece disposed at a second end portion of the hollow section, where the first end portion includes a fluid input and is configured for attachment to a portion of a gripper assembly. In another illustrative embodiment, the element includes a first side portion. In another illustrative embodiment, the element includes a second side portion opposite the first side portion, wherein the first side portion has a surface area less than the second side portion. In another illustrative embodiment, the hollow section may be configured to selectively receive fluid through the fluid input to adjust pressure within the hollow section and cause the hollow section to selectively actuate. In another illustrative embodiment, the hollow section may include a plurality of zones, wherein one or more of the plurality of zones are individually pressurizable to control movement of one or more portions of the hollow section.

A gripper assembly is disclosed, in accordance with one or more embodiments of the present disclosure. In an illustrative embodiment, the gripper assembly includes a plurality of flexible gripper elements. In another illustrative embodiment, the gripper assembly includes a plurality of mounting platforms. In another illustrative embodiment, a particular flexible gripper element of the gripper assembly is secured to a particular mounting platform. In another illustrative embodiment, the particular mounting platform includes a fluid port for fluidically coupling a fluid source to a fluid input of the particular flexible gripper element. In another illustrative embodiment, two or more of the flexible gripper elements are selectively pressurizable for selectively actuating the two or more flexible gripper elements to reversibly grip an object. In another illustrative embodiment, the two or more of the plurality of flexible gripper elements includes a hollow section, a first end piece disposed at a first end portion of the hollow section, a second end piece disposed at a second end portion of the hollow section, a first side portion, and a second side portion opposite the first side portion. In another illustrative embodiment, the first side portion has a surface area less than the second side portion. In another illustrative embodiment, the hollow section is configured to selectively receive fluid through the fluid input to adjust pressure within the hollow section and cause the hollow section to selectively actuate. In another illustrative embodiment, the hollow section includes a plurality of zones, wherein one or more of the plurality of zones are individually pressurizable to control movement of one or more portions of the hollow section.

A gripper assembly is disclosed in accordance with one or more embodiments of the present disclosure. In one illustrative embodiment, the gripper assembly includes a plurality of flexible gripper elements. In another illustrative embodiment, the gripper assembly includes one or more flexible bridge elements. In another illustrative embodiment, the one or more flexible bridge elements are configured to fluidically couple two or more of the plurality of flexible gripper elements. In another illustrative embodiment, at least one of one or more of the flexible gripper elements or the one or more flexible bridge elements are selectively pressurizable for reversibly gripping an object with the two or more of the flexible gripper elements. In another illustrative embodiment, the one or more of the flexible gripper elements includes a hollow section, a first end piece disposed at a first end of the hollow section, a second end piece disposed at a second end portion of the hollow section, a first side portion; and a second side portion opposite the first side portion. In another illustrative embodiment, the first side portion has a surface area less than the second side portion. In another illustrative embodiment, the hollow section is configured to selectively receive fluid through a fluid input to adjust pressure within the hollow section and cause the hollow section to selectively actuate.

A method is disclosed in accordance with one or more illustrative embodiments of the present disclosure. In one illustrative embodiment, the method includes providing a plastic material. In another illustrative embodiment, the method includes forming, via an additive manufacturing process, a flexible gripper element with the plastic material. In another illustrative embodiment, the forming the flexible gripper element includes forming a hollow section and forming a first side portion and a second side portion opposite the first side portion such that the first side portion has a surface area less than the second side portion. In another illustrative embodiment, the flexible gripper element is configured to selectively deform upon receiving fluid flow through the hollow section.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIGS. 1A-6, a flexible gripper assembly with multiple flexible gripper elements is disclosed, in accordance with one or more embodiments of the present disclosure.

Embodiments of the present disclosure are directed to a flexible gripper element configured to selectively receive fluid through a fluid input. In this regard, the fluid input may be used to selectively adjust pressure within the flexible gripper element. The ability to selectively adjust pressure may allow for selective actuation of the given gripper element. Selective actuation of the gripper element may allow the flexible gripper element to transition between one or more states, such as, but not limited to, a pre-curved state or a straightened state.

Additional embodiments of the present disclosure are directed to multi-zone gripper elements and/or bridging elements. These elements provide for additional degrees of freedom of the gripper elements and the gripper assembly and allow for increasingly complex movements of the gripper elements and the gripper assembly, much like the phalanges, metacarpals, carpals, and knuckles in the human hand.

Figure 1A:
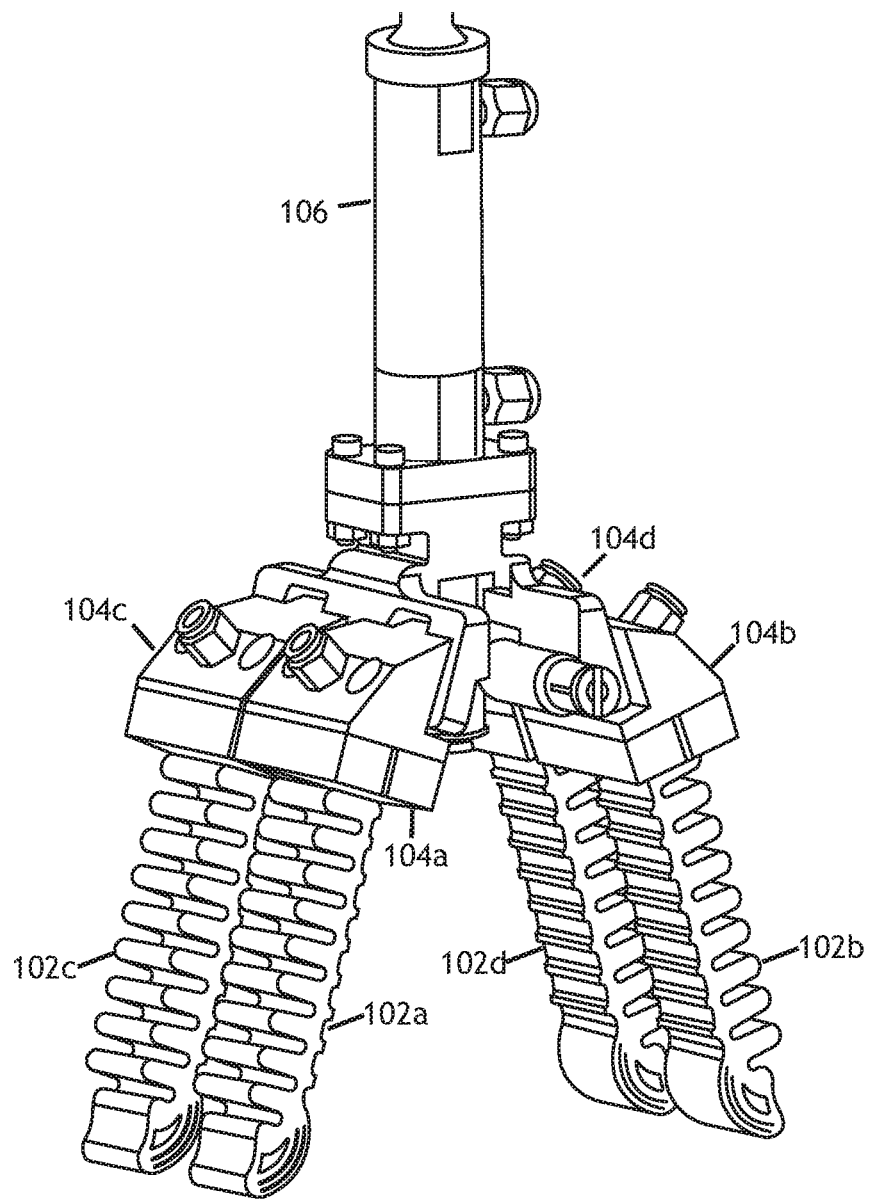
FIG. 1A illustrates an isometric view of a gripper assembly, in accordance with one or more embodiments of the present disclosure.

FIG. 1A illustrates a gripper assembly 100 including a plurality of flexible gripper elements 102a-102d, in accordance with one or more embodiments of the present disclosure.

In one embodiment, one or more of the flexible gripper elements 102a-102d are attached to a portion of the gripper assembly 100. For example, the flexible gripper elements 102a-102d may be attached to the gripper assembly 100 via mounting platforms 104a-104d. For instance, flexible gripper element 102a may be attached to mounting platform 104a, flexible gripper element 102b may be attached to mounting platform 104b, flexible gripper element 102c may be attached to mounting platform 104c, and flexible gripper element 102d may be attached to mounting platform 104d. It is noted herein that the scope of the present disclosure is not limited to the number or configuration of the flexible gripper elements 102a-102d as illustrated. Rather, any number or configuration of flexible gripper elements 102 may be attached to the gripper assembly (e.g., one, two, three, four, six, eight, etc.).

In some embodiments, the flexible gripper elements 102a-102d may be connected to a stage 106 via the mounting platforms 104a-104d. In this regard, the mounting platform 104 and the stage 106 may be connected by any type of suitable attachment mechanism known in the art, including, but not limited to, adhesives, welding, magnetic coupling, clamps, clasps, pins, retaining rings, rivets, bolts, or any other attachment mechanism.

Figure 1B:
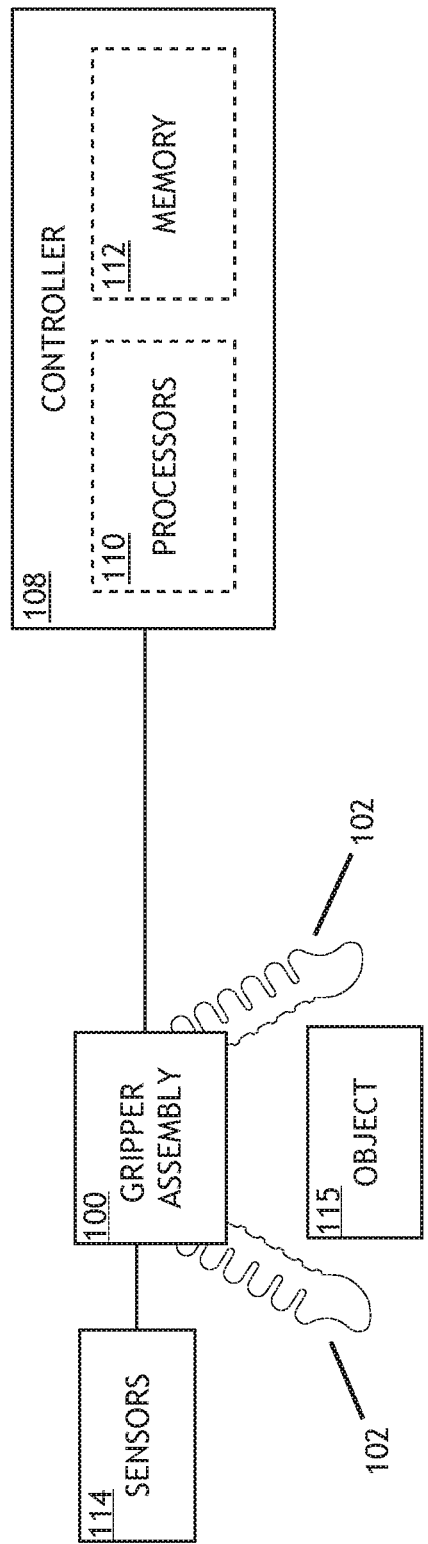
FIG. 1B illustrates a block diagram view of the gripper assembly of FIG. 1A connected to a controller and one or more sensors, in accordance with one or more embodiments of the present disclosure.

FIG. 1B illustrates a simplified schematic diagram of the gripper assembly 100, in accordance with one or more embodiments of the present disclosure.

In one embodiment, the gripper assembly 100 is communicatively coupled to a controller 108. For example, various components of the gripper assembly 100 may be communicatively coupled to the controller 108. For instance, one or more grip control elements (e.g., one or more pumps or valves configured to selectively adjust fluid flow to one or more flexible gripper elements 102) may be communicatively coupled to and controlled by controller 108. In another instance, one or more stage positions for adjusting a position of the stage 106 may be communicatively coupled to and controlled by controller 108. In another instance, one or more sensors 114 for sensing one or more conditions related to an object 115, the one or more flexible gripper elements 102, and/or the gripper assembly 100 may be communicatively coupled to and configured to transmit sensing data to the controller 108. The components of the gripper assembly 100 may be communicatively coupled to each other and/or to the controller 108 via a wireline (e.g., copper wire, fiber optic cable, and the like) or wireless connection (e.g., RF coupling, IR coupling, data network communication (e.g., WiFi, WiMax, Bluetooth and the like), or in any other manner known in the art.

In some embodiments, the controller 108 may be configured to receive information from the one or more sensors 114. The controller 108 may be configured to use the received information to adjust one or more conditions of the gripper assembly 100. The one or more conditions of the gripper assembly 100 may include, but are not limited to, fluid flow (e.g., to adjust internal pressure within the flexible gripper element 102), grip strength, position and/or orientation of the gripper assembly 100 (e.g., flexible gripper element 102, mounting platform 104, stage 106, etc.), or angle of attack relative to an object 115.

In some embodiments, the position and orientation of the gripper assembly 100 and/or the flexible gripper element 102a-102d may be controlled. For example, a position and orientation of the gripper assembly 100 and or the flexible gripper elements 102a-102d may be defined by a Cartesian, spherical, cylindrical, or any other coordinate system known in the art. In some embodiments, determination of the position and the orientation of the gripper assembly 100 and the flexible gripper elements 102a-102d relative to the object 115 (to be picked up) or nearby environmental obstructions may be accomplished by the one or more sensors 114. Various components of the gripper assembly 100 may be configured to translate or be oriented independently of other components of the system. In this regard, the flexible gripper elements 102a-102d, mounting platform 104, and/or the stage 106 may be translated, rotated, and/or orientated by one or more positioners. In one embodiment, the one or more positioners of the gripper assembly 100 may include one or more linear and/or rotation actuators or actuation stages to provide linear and/or rotational motion to the gripper assembly 100. Further, each of the mounting platforms 104 may include one or more linear and/or one or more rotational actuators or actuation stages to provide individual linear and/or rotation motion to each of the flexible gripper elements 102a-102d.

The one or more sensors 114 may include any sensor known in the art. In some embodiments, the one or more sensors 114 may include tactile sensors. The one or more tactile sensors may include, but are not limited to, piezoelectric sensors, piezoresistive sensors, hydraulic sensors, pressure sensors, strain gauges, or vibration sensors. In one embodiment, the tactile sensor may be disposed in or on a portion of one or more of the flexible gripper elements 102a-102d (e.g., second end piece 208) of the gripper assembly 100. The tactile sensors may provide data to the controller 108. Such data may include, but is not limited to, force/pressure measured by the tactile sensor. Recognizing an increase in a force/pressure reading may be indicative of an interaction between the one or more of the flexible gripper elements 102a-102d and the object 115. In this regard, measurement of the force by one or more tactile sensors may allow the controller 108 to determine when the flexible gripper elements 102a-102d are exerting adequate force to lift the object 115.

In some embodiments, the one or more sensors 114 may include an inertial measurement unit (IMU) sensor. The IMU sensor may include one or more gyros and/or accelerometers. In this regard, the information from the IMU may be used to determine a position and orientation of the gripper assembly 100. The determined position and orientation may be provided to the controller 108 via a feed-back data connection to adjust the position and/or the orientation of the gripper assembly 100.

In some embodiments, the one or more sensors 114 may include one or more optical sensors. The optical sensors may include any optical sensor, including, but not limited to, light sensors, photoresistors, photodiodes, phototransistors, charge-coupled devices, or reverse-biased light emitting diodes. In this regard, the one or more optical sensors may capture and convert electromagnetic radiation into a signal (e.g., digital or analog). The signal measured by the one or more optical sensors may be provided to controller 108. In another embodiment, the one or more sensors 114 may include one or more cameras.

In some embodiments, the controller 108 may be configured to utilize sensor data provided from the one or more sensors 114 to determine one or more characteristics of the object 115 or one or more characteristics of the gripper assembly 100. The one or more characteristics of the object 115 may include, but are not limited to, object dimensions (e.g., geometry), object surface texture, distance from the object 115, optimal angle of attack, or a surface of the object 115 to be gripped. In this regard, the controller 108 may be configured to receive data from the one or more sensors 114 and determine characteristics of the object 115. The controller 108 may determine the characteristics using a machine learning algorithm, in accordance with one or more embodiments of the present disclosure.

In some embodiments, the controller 108 may execute a machine learning algorithm stored in a memory 112 based on data provided by the one or more sensors 114. The controller 108 may analyze the data provided by the one or more sensors 114 in combination with a model and/or classifier to determine a condition of the gripper assembly 100 configured to grip the object. As may be understood by one of ordinary skill in the art, such machine learning model may be performed using an image model and/or classifier. The machine learning algorithm may apply a generated model to the received image data from the one or more sensors 114 and determine one or more outputs. The one or more determined outputs may be used by the controller 108 to adjust one or more conditions of the gripper assembly 100 (e.g., positioning, fluid pressure, etc.). The generated model may be previously trained (e.g., with sensor data of the object 115 in different orientations). Furthermore, the machine learning algorithm may be continuously updated based on the current sensor data. Continuous updates to the machine learning algorithm may include the result of gripping the object 115 (e.g., success/failure, position/orientation measurements from the IMU sensors, data from the optical sensors, pressure/force measurements from the tactile sensors, etc.). In this regard, the machine learning algorithm may be continuously trained and updated.

In some embodiments, the controller 108 may include one or more processors 110. The one or more processors 110 may include any one or more processing elements known in the art. In this sense, the one or more processors 110 may include any microprocessor-type device configured to execute software algorithms and/or instructions. In one embodiment, the one or more processors 110 may consist of a desktop computer, mainframe computer system, workstation, image computer, parallel processor, or other computer system (e.g., networked computer) configured to execute a program configured to operate the gripper assembly 100, as described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors 110. In general, the term "processor" may be broadly defined to encompass any device having one or more processing elements, which execute program instructions from memory (e.g., memory 112). Moreover, different components of the gripper assembly 100 (e.g., sensors 114) may include processor or logic elements suitable for carrying out at least a portion of the steps described throughout the present disclosure. Therefore, the above description should not be interpreted as a limitation on the embodiments of the present disclosure but merely an illustration.

In some embodiments, the processors 110 may be configured to execute a set of program instructions stored in memory 112. The set of program instructions are configured to cause the processors 110 to carry out various steps of the present disclosure. The memory 112 may include any storage medium known in the art suitable for storing program instructions executable by the associated one or more processors 110 and the data received from the transmitting devices (e.g., sensors). For example, the memory 112 may include a non-transitory memory medium. For instance, the memory 112 may include, but is not limited to, a read-only memory (ROM), a random-access memory (RAM), a magnetic or optical memory device (e.g., disk), a magnetic tape, a solid-state drive and the like. In another embodiment, the memory 112 may be configured to store data including, but not limited to, pressure readings, Cartesian coordinates, and/or orientation, and the like received from the one or more sensors 114. It is further noted that memory 112 may be housed in a common controller housing with the one or more processors 110. In an alternative embodiment, the memory 112 may be located remotely with respect to the physical location of the processors 110, controller 108, and the like. In another embodiment, the memory 112 maintains program instructions for causing the one or more processors 110 to carry out the various steps described through the present disclosure.

Figure 2A:
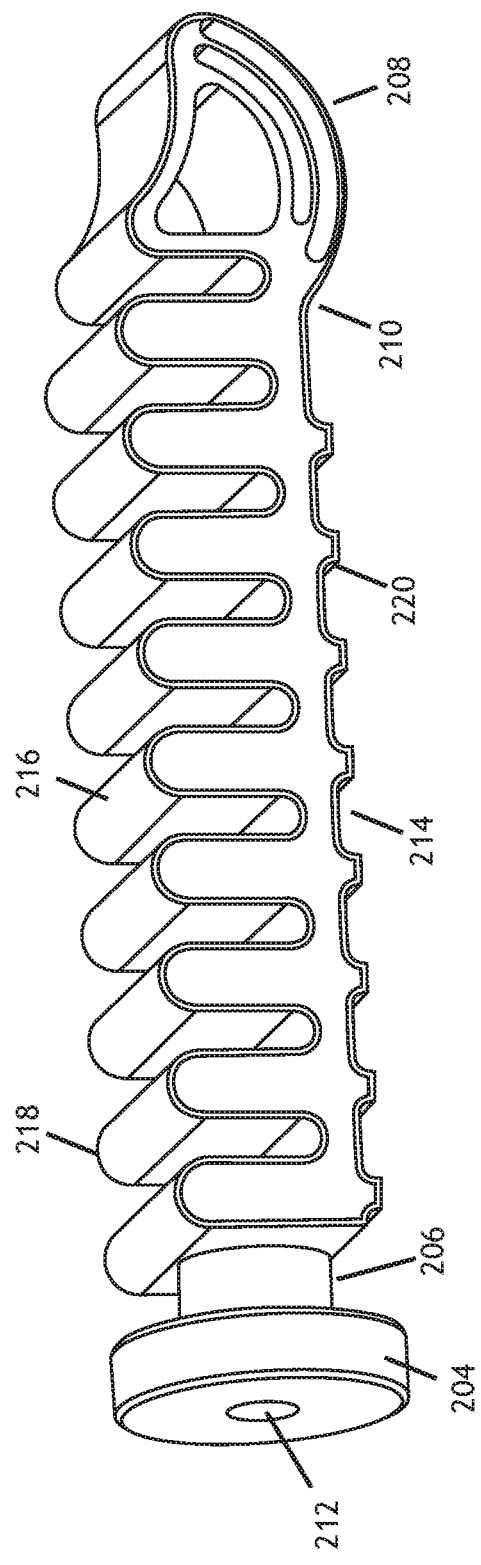
FIG. 2A illustrates a schematic view of a flexible gripper element, in accordance with one or more embodiments of the present disclosure.
Figure 2B:
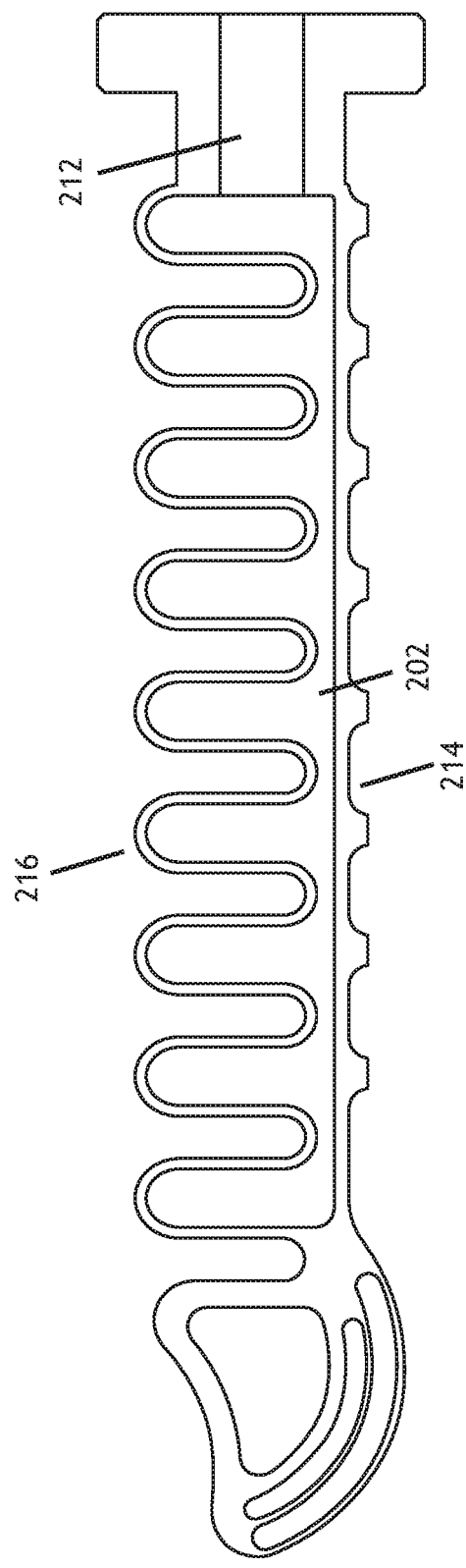
FIG. 2B illustrates a schematic view of a flexible gripper element, in accordance with one or more embodiments of the present disclosure.

FIGS. 2A and 2B illustrate schematic views of a flexible gripper element 102, in accordance with one or more embodiments of the present disclosure.

In one embodiment, the flexible gripper element 102 includes a hollow section 202 (including a first end portion 206 and second end portion 210), a first end piece 204, a second end piece 208, a fluid input 212, a first side portion 214, and a second side portion 216. The first end piece 204 may be disposed at the first end portion 206 of the hollow section 202. The second end piece 208 may be disposed at the second end portion 210 of the hollow section 202. The hollow section 202 may be configured to selectively receive fluid through the fluid input 212. The first side portion 214 may have a surface area less than the second side portion 216.

The fluid input 212 may receive fluid (e.g., gas or liquid) from a fluid source and direct the fluid into the hollow section 202 of the flexible gripper element 102. In this regard, fluid may be selectively supplied (e.g., via one or more pumps and/or valves) to the hollow section 202 of the flexible gripper element 102 to adjust pressure within the hollow section 202 of the flexible gripper element 102.

In one embodiment, fluid may be supplied to the hollow section 202 of the flexible gripper element 102 via the fluid input 212. For example, the fluid input 212 may be configured to attach to a fluid port (not shown) of a corresponding mounting platform 104 so as to fluidically couple a fluid source to the hollow section 202 and provide fluid to the flexible gripper element 102. In this regard, the fluid input 212 may receive fluid from the fluid port (and one or more pumps/valves) to selectively pressurize the hollow section 202. The fluid may be used to increase pressure within the hollow section 202. An increase in pressure within the hollow section 202 may allow for selective control of the movement of the flexible gripper element 102 (e.g., as the pressure increases the hollow section may curve inwards toward a first side). Such selective control of the movement of one or more flexible gripper elements 102 may allow the one or more flexible gripper elements 102 to grip the object 115.

In another embodiment, the fluid may also be removed from the hollow section 202 (via the fluid input 212 and port) to reduce the pressure within the hollow section 202, thereby returning the flexible gripper element 102 to a depressurized state.

The fluid used to pressurize the hollow section 202 may be any suitable fluid, including, but not limited to, one or more gases (e.g., air, nitrogen, and the like) or one or more liquids (e.g., water-based liquids).

In some embodiments, the flexible gripper element includes first end piece 204 disposed at first end portion 206 of the hollow section 202. The first end piece 204 may include a geometrical shape suitable for retaining the flexible gripper element 102 to the gripper assembly 100. For instance, the first end piece 204 may be circular (e.g., cylindrical, cone shaped, etc.), rectangular (e.g., cuboid, truncated rectangular pyramid, etc.), or any other suitable shape (e.g., polyhedrons). In this regard, a face portion of the first end piece 204 may be used to retain the flexible gripper element 102 to the mounting platform 104.

The first end portion 206 may transfer fluid from the fluid input 212 to the hollow section 202. The first end portion 206 may be any suitable shape, including, but not limited to, cylindrical. In some embodiments, a portion of the first end portion 206 may be clamped or otherwise gripped by the mounting platform 104.

In some embodiments, the flexible gripper element 102 includes second end piece 208 disposed at second end portion 210 of the hollow section 202. The second end piece 208 may include one or more pliable elements to assist the flexible gripper element 102 in gripping the object 115. The pliable elements may include, but are not limited to, one or more pliable layers 222 and/or thumb piece 232. The thumb piece 232 may be configured to provide support to the one or more pliable layers 222, such that when the flexible gripper element 102 grips the object 115 by the pliable layers 222, the thumb piece 232 may act as a counter-force to enhance rigidity. The second end portion 210 may be hollow (permitting fluid flow to the one or more pliable elements) or solid (preventing fluid flow to the one or more pliable elements).

In some embodiments, the flexible gripper element 102 includes hollow section 202 defined by first side portion 214 and second side portion 216. The first side portion 214 may have a surface area smaller than the second side portion 216 causing selective actuation of the flexible gripper element 102 when the hollow section 202 is under pressure. In this regard, the selective actuation may curve the flexible gripper element 102 towards the first side portion 214 in order to grip the object 115. The hollow section 202 may be configured to receive fluid in order to be pressurized by a fluid connection from the fluid input 212.

The terms "first side portion 214" and "second side portion 216" are not intended to limit the sides of the flexible gripper element 102 to a planar shape. For example, either of the first side portion 214 or the second side portion 216 may include a non-planar shape. As illustrated in FIG. 2A, the second side portion 216 may include a plurality of chambers 218. The chambers 218 may generally take the shape of a three-dimensional rectangle (hyperrectangle) with one or more rounded edges. The chambers 218 may include a geometry including a first direction (e.g., length), a second direction (e.g., width), and a third direction (e.g., height). Similarly, the first side portion 214 may include a non-planar shape. As illustrated in FIG. 2A, the first side portion 214 may include a plurality of protrusions 220. The protrusions 220 of the first side portion 214 may have a first direction (e.g., length), a second direction (e.g., width), and a third direction (e.g., height). The dimensions of the third direction of the protrusions 220 may generally be less than the dimensions of the third direction of the chambers 218 (e.g., the height of the protrusions 220 is less than the height of the chambers 218). In this regard, an external surface of the chambers 218 on the second side portion 216 may cause the second side portion 216 to have a surface area larger than the first side portion 214.

The chambers 218 and protrusions 220 are not intended to be limiting on the various embodiments of the present disclosure. For example, either of the chambers 218 or the protrusions 220 may include filleted, chamfered, rounded, convex, or concave geometries. In this regard, a protrusion may extend into the first side portion 214 or outward from the first side portion 214.

Figure 2C:
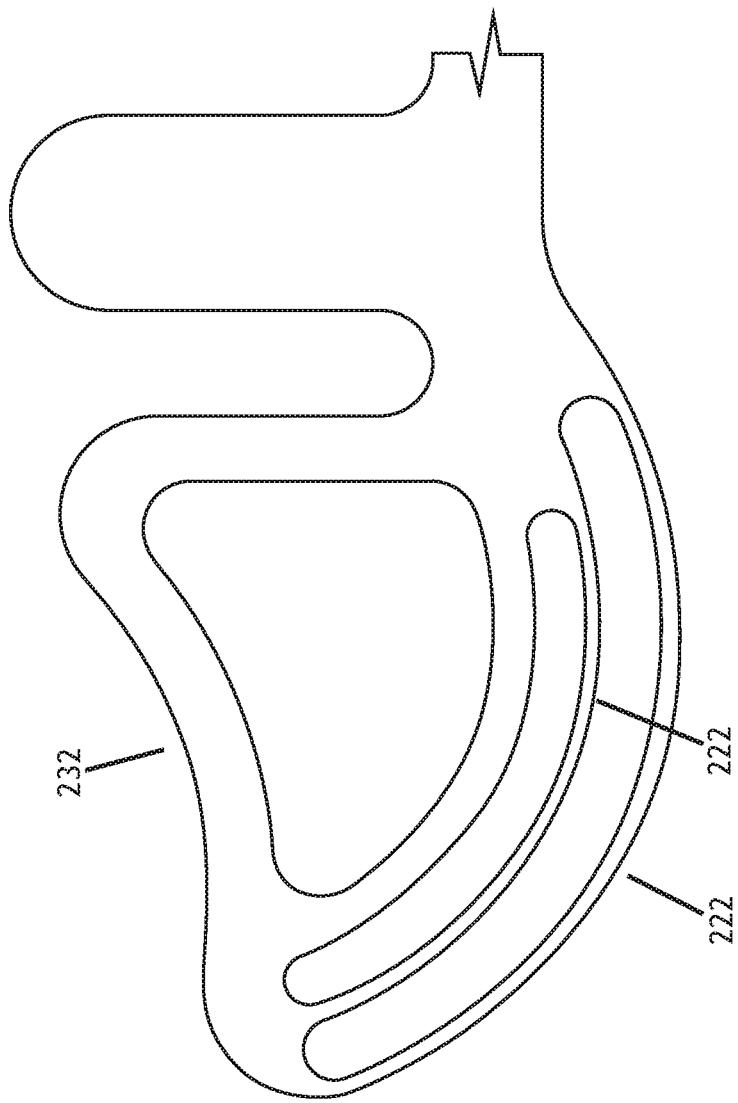
FIG. 2C illustrates a schematic view of a second end piece with one or more pliable layers, in accordance with one or more embodiments of the present disclosure.

FIG. 2C illustrates a side view of a second end piece 208 with one or more pliable layers 222, in accordance with one or more embodiments of the present disclosure.

Figure 5:
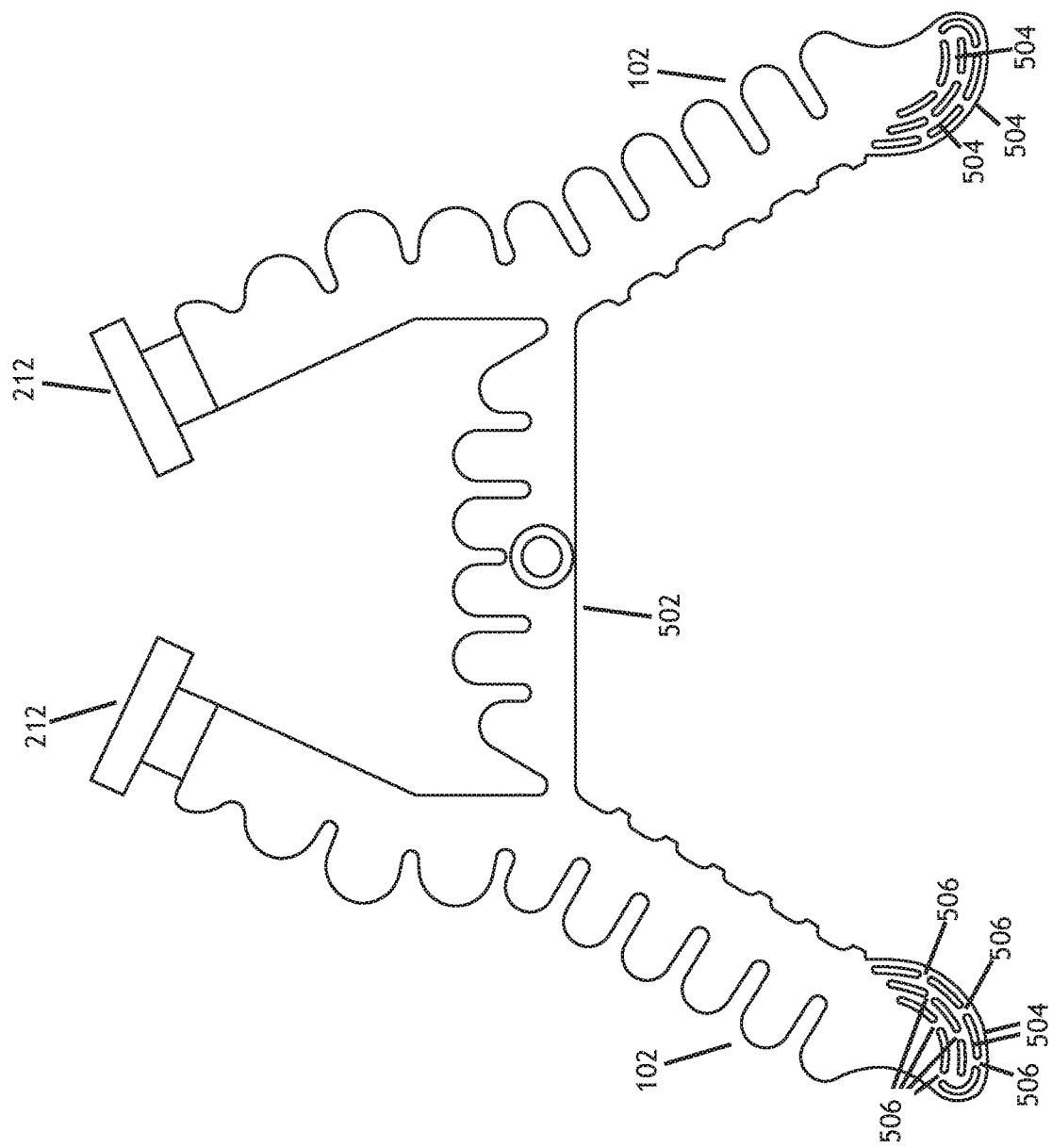
FIG. 5 illustrates a side view of a gripper assembly with a bridge, in accordance with one or more embodiments of the present disclosure.

In some embodiments, the second end piece 208 may include one or more pliable elements. The one or more pliable elements may include one or more pliable layers 222. The pliable layers 222 may provide a contact surface between the flexible gripper element 102 and object 115. In this regard, the pliable layers 222 may allow the flexible gripper element 102 to grip the object 115. The pliable layers 222 may be configured as straight portions or as non-straight portions. A non-straight portion of the pliable layers 222 may be configured to span a selected angle. For example, the pliable layers 222 may be curved and extend over an angle. In this regard, the pliable layers 222 may include a geometry similar to a fingertip. By way of another example, the pliable layers 222 may be further configured to span a selected angle in other geometries, such as, but not limited to, a planar geometry or a multi-planar geometry with one or more bends in the pliable layer 222 (e.g., triangular prism, truncated pyramid, etc.). The one or more pliable layers 222 may be composed of a material capable of elastically deforming upon contact with the object 115. In this regard, the one or more pliable layers 222 may allow for an increased surface area when contacting the object 115. Such increased surface area may improve the grip strength of the flexible gripper element 102 due to an increased frictional surface area. For a visual example of further embodiments of a pliable layer, FIG. 5 depicts pliable layers 504 with pliable layer support structures 506.

Figure 2D:
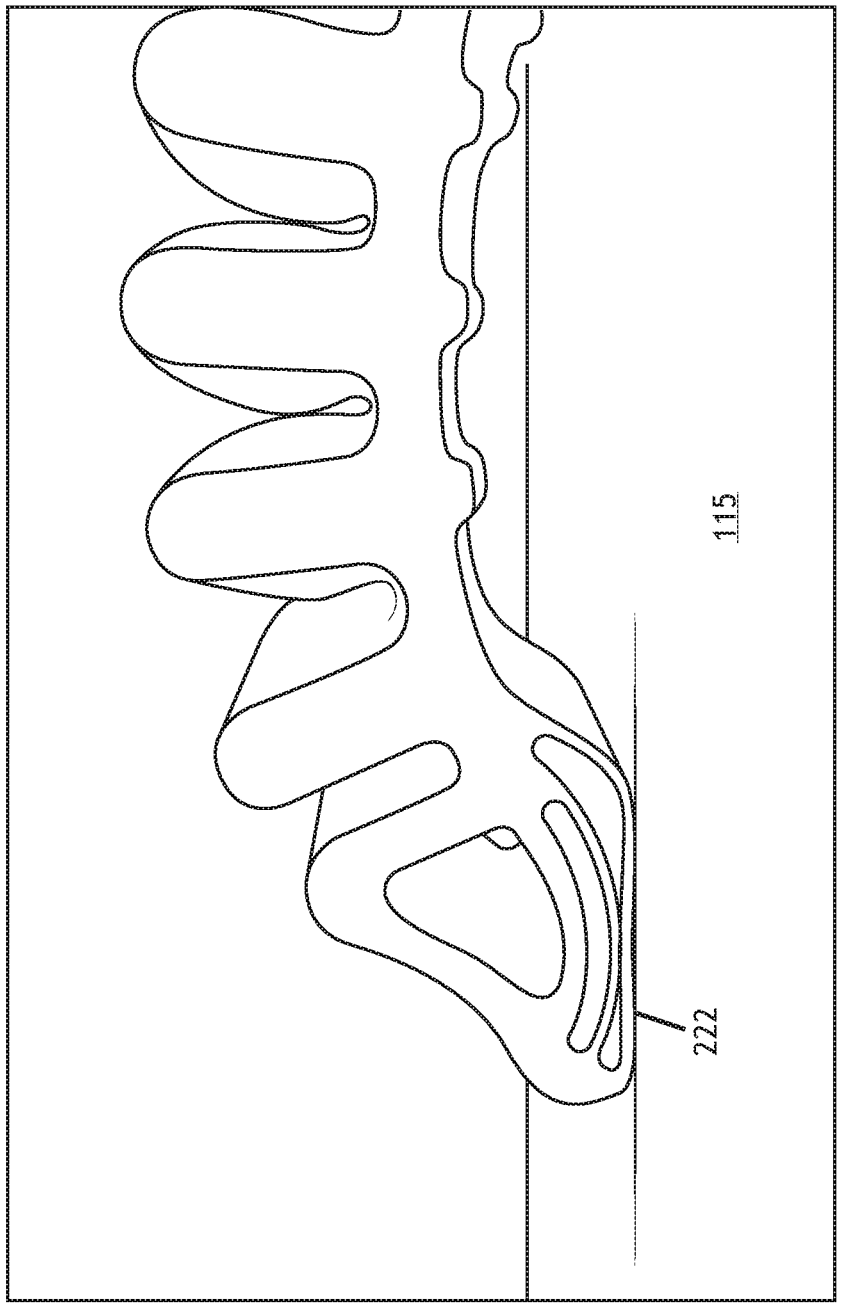
FIG. 2D illustrates an isometric view of a flexible gripper element gripping an object, in accordance with one or more embodiments of the present disclosure.

FIG. 2D illustrates an isometric view of a flexible gripper element 102 gripping an object 115, in accordance with one or more embodiments of the present disclosure.

In some embodiments, the one or more pliable layers 222 may be composed of one or more materials. The one or more materials may include, but are not limited to, polyamides, polycarbonates, polyethylenes, polypropylenes, thermoplastic polyurethane (TPU), elastomers, or any other material described herein. In this regard, the pliable layers 222 may be configured to elastically deform. Such elastic deformation of the pliable layers 222 may allow the flexible gripper element 102 to grip an object 115 without damaging the object 115. For example, as the forces exerted through the pliable layers 222 increase, the pliable layers may deform elastically. Such deformation may prevent or reduce the deformations undergone by the object 115 being gripped (i.e., by reducing point-loads on the object). Furthermore, deformation in the pliable layers 222 may increase the surface area between the pliable layers 222 and the object 115 being gripped. An increase in surface area may decrease the overall gripping force required to grip the object 115.

Figure 2E:
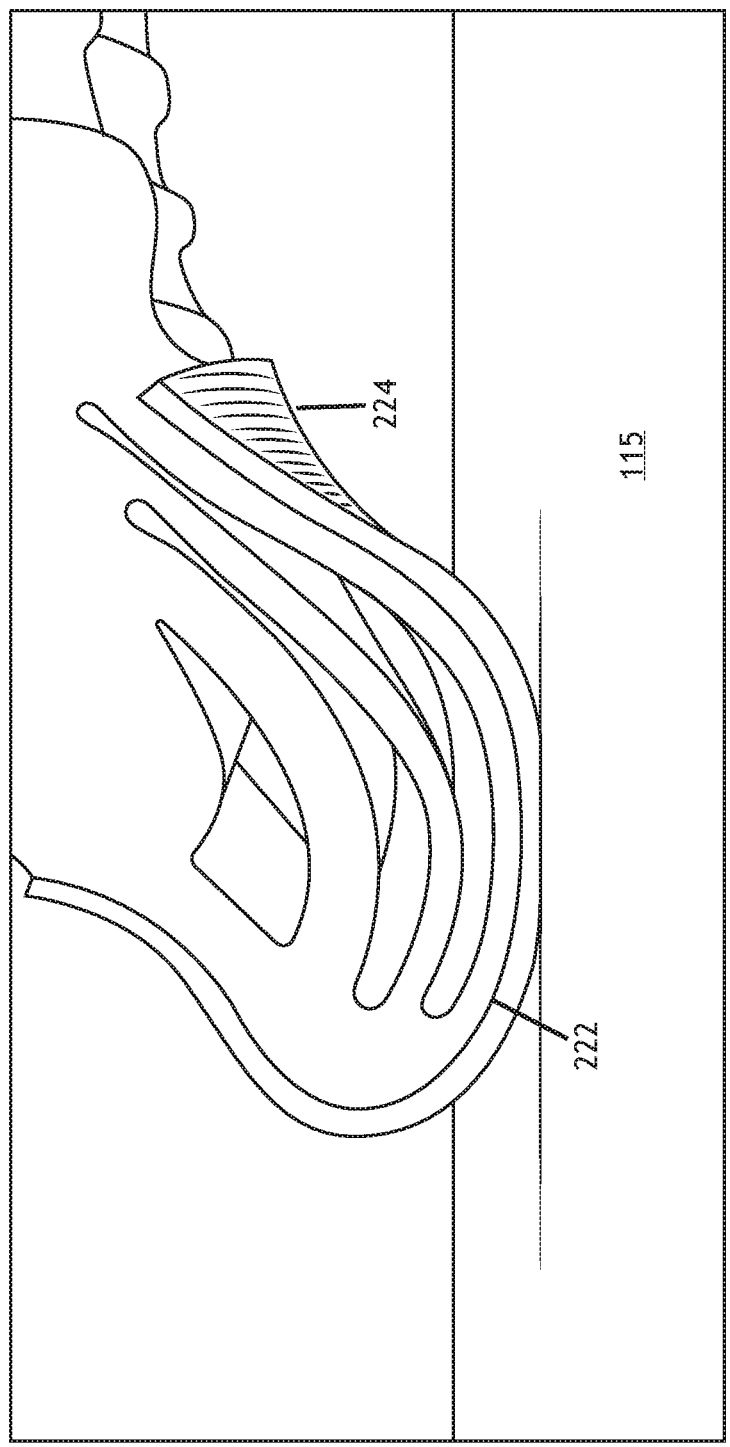
FIG. 2E illustrates an isometric view of a flexible gripper element with one or more pliable layers and a secondary material, in accordance with one or more embodiments of the present disclosure.

FIG. 2E illustrates an isometric view of a flexible gripper element 102, in accordance with one or more embodiments of the present disclosure.

In some embodiments, the one or more pliable layers 222 of the flexible gripper element 102 may include a secondary material 224. The secondary material 224 may be composed of a different material than the one or more pliable layers 222. In this regard, the coefficient of friction between the secondary material 224 and the object may be different (e.g., larger) than the coefficient of friction between the one or more pliable layers and the object. The different friction coefficient of the secondary material 224 may allow the flexible gripper element 102 to grip an object with a different force than compared to a flexible gripper element 102 with no secondary material 224. Furthermore, the secondary material 224 may be selected based on the object to be grabbed. For example, some objects may require a different secondary material 224 to reach desired friction coefficients. In this regard, the secondary material 224 may be selected based on the object to be grabbed. Generally, it may be desirable to maximize the coefficient of friction between the secondary material 224 and the object to be grabbed. However, this is not intended to be limiting on the various embodiments of the present disclosure. For example, some objects may be relatively more soft or fragile, such that using a secondary material 224 with a lower coefficient of friction may be desirable. It is envisioned that the secondary material 224 may be formed directly onto the one or more pliable layers 222, stuck to the one or more pliable layers 222 by adhesive, or attached by other removable means.

Figure 2F:
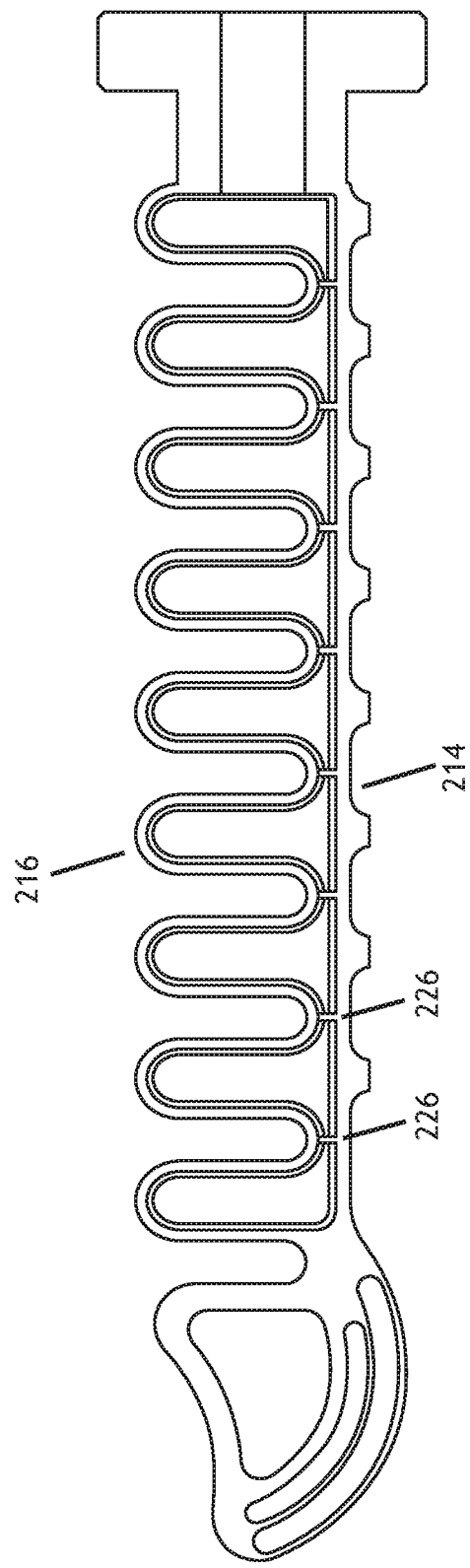
FIG. 2F illustrates a side view of a flexible gripper element with one or more ribs, in accordance with one or more embodiments of the present disclosure.

FIG. 2F illustrates a side view of a flexible gripper element 102, in accordance with one or more embodiments of the present disclosure.

In some embodiments, the flexible gripper element 102 may include a plurality of ribs 226. The plurality of ribs 226 may be disposed within the hollow section 202 by an attachment to an inner surface of the first side portion 214 and the second side portion 216. The ribs 226 may be configured to inhibit expansion of the hollow section 202 along a dimension of the hollow section 202. In this regard, an increased stiffness due to the inhibited expansion may reduce bulging of the hollow section 202 and prevent expansion between the first side portion 214 and the second side portion 216. Reduced bulging in the hollow section 202 may increase the grip strength of the flexible gripper element 102, due to a reduction in wasted pressure. Furthermore, reduced bulging by the ribs 226 may increase the pressure before failure in the flexible gripper element 102. The ribs 226 may enable fluid flow through the hollow section 202 by a gap (not depicted). In this regard, the ribs may be used to stiffen the gripper, while still allowing fluid to freely flow through the gripper.

Figure 2G:
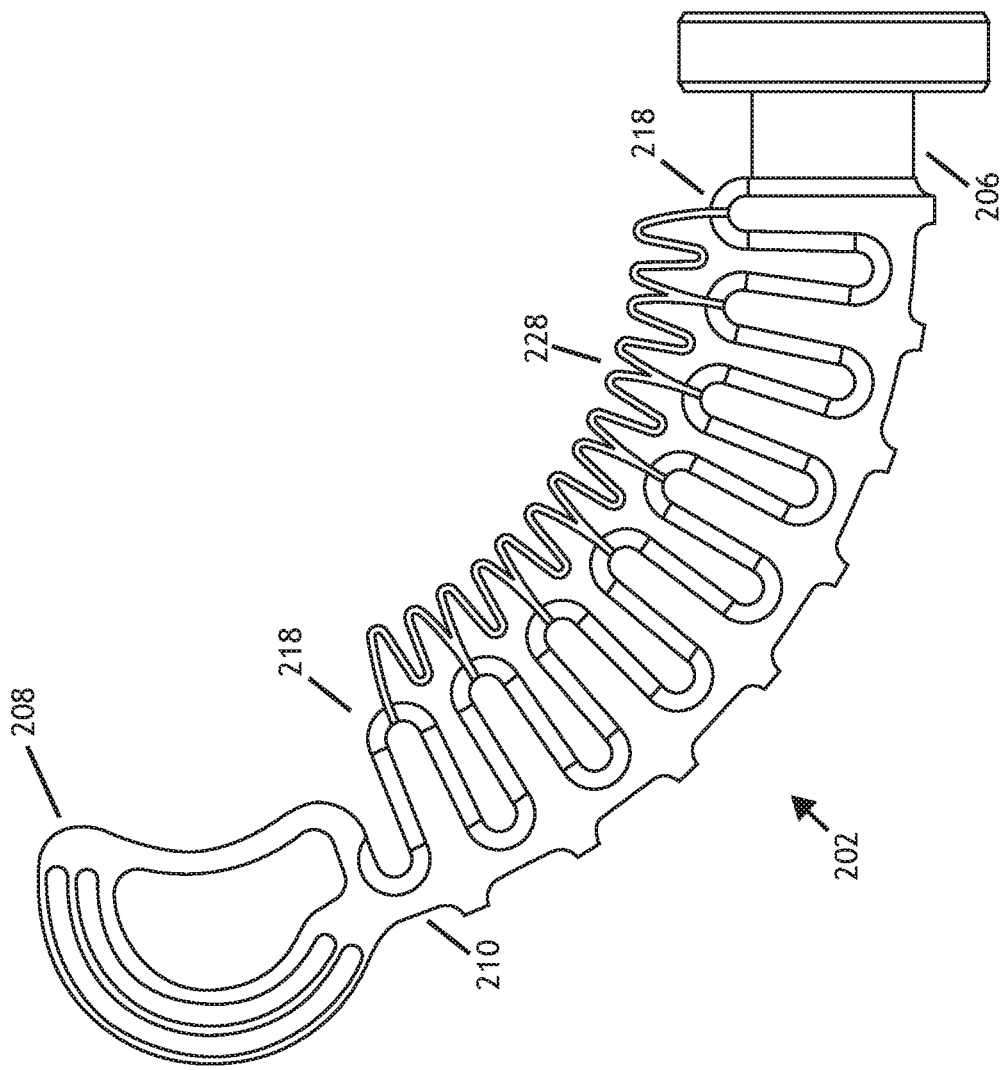
FIG. 2G illustrates a side view of a flexible gripper element in a pre-curved state, in accordance with one or more embodiments of the present disclosure.

FIG. 2G illustrates a flexible gripper element 102 in a pre-curved state, in accordance with one or more embodiments of the present disclosure.

In some embodiments, the flexible gripper element 102 may include a retraction element. The retraction element may include a spring 228. The spring 228 may include any spring known in the art, such as, but not limited to, helical springs, coil springs, tension springs, compression springs, or gas springs. The spring 228 may be configured to maintain the hollow section 202 in a pre-curved state prior to pressurization (e.g., due to a spring force). Additionally, the spring 228 may cause the flexible gripper element 102 to return to the pre-curved state after fluid pressure is released from the hollow section 202. The spring 228 may return the flexible gripper element 102 to the pre-curved position without the use of a vacuum to suction the fluid from the hollow section 202. However, the recitations of spring 228 are not intended to limit the various embodiments of the present disclosure. For example, a retraction element may include a vacuum, to maintain the hollow section 202 in the pre-curved state prior to pressurization and/or to return the hollow section 202 to the pre-curved state after pressurization.

The spring 228 may be attached to outer walls of the chambers 218 on the hollow section 202 at the first end portion 206 and the second end portion 210. However, this is not intended as a limitation of the various embodiments of the present disclosure. For example, the spring 228 and/or the retraction element may be attached to any one of the hollow section 202, first end piece 204, second end piece 208, mounting platform 104, and/or stage 106.

Figure 3:
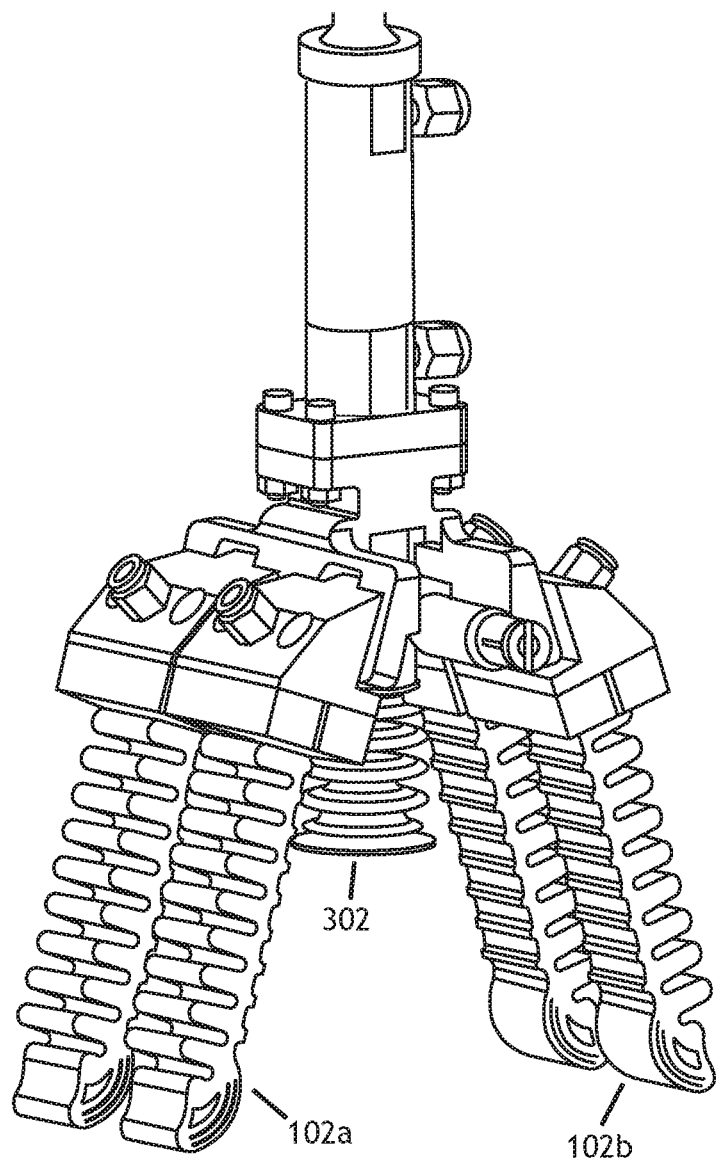
FIG. 3 illustrates an isometric view of a gripper assembly with a suction cup, in accordance with one or more embodiments of the present disclosure.

FIG. 3 illustrates an isometric view of the gripper assembly 100, in accordance with one or more embodiments of the present system.

In some embodiments, the gripper assembly 100 may include one or more suction cups (e.g., suction cup 302). The one or more suction cups may include any suction cup known in the art. Such suction cups may generally include a cup to mate against the object and a vacuum generator (e.g., vacuum ejector, blower, or pump). The suction cup 302 may be disposed between the flexible gripper element 102a and the flexible gripper element 102b, and be configured to secure the object by assisting the flexible gripper elements 102a, 102b in gripping the object. In this regard, a suction force by the suction cup 302 may reduce the force required to grip the object. However, the discussion of suction cup 302 and the configuration depicted in FIG. 3 is not intended to be limiting on the various embodiments of the present disclosure. For example, the suction cup 302 may replace one or more of the flexible gripper elements 102.

Figure 4:
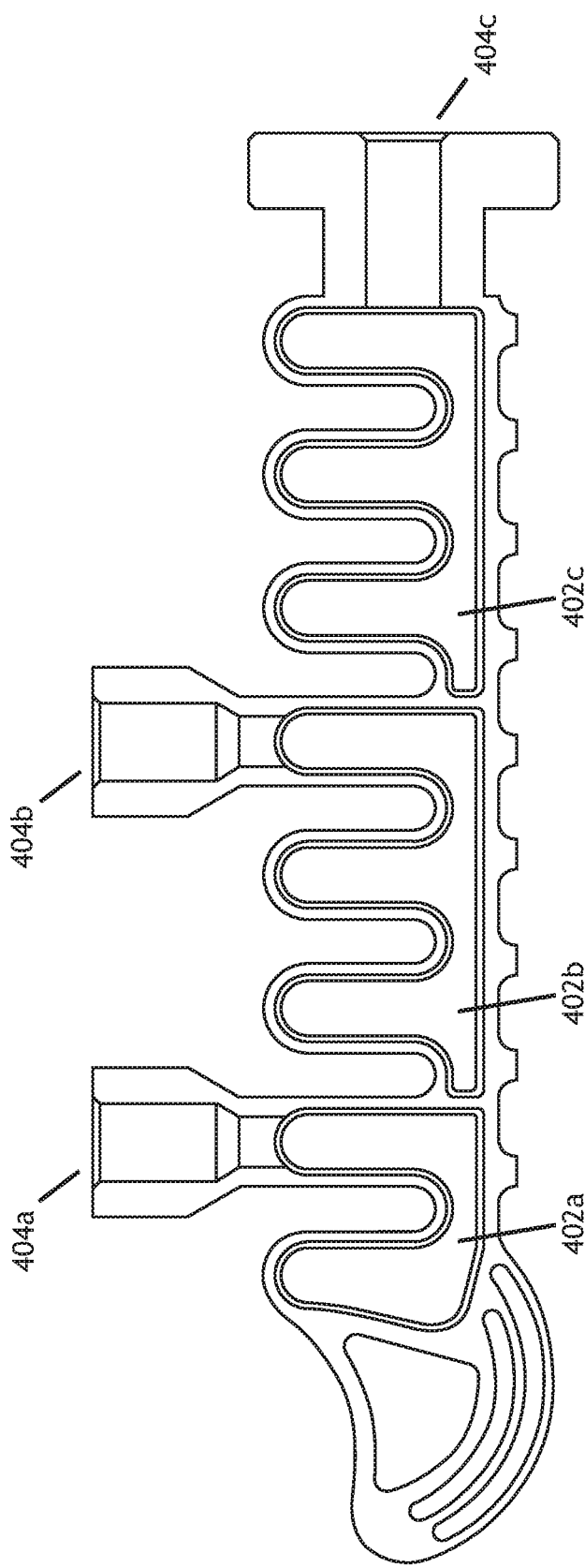
FIG. 4 illustrates a side view of a flexible gripper element with a plurality of zones, in accordance with one or more embodiments of the present disclosure.

FIG. 4 illustrates a side view of the flexible gripper element 102, in accordance with one or more embodiments of the present disclosure.

In some embodiments, the flexible gripper element 102 may include a hollow section 202 with a plurality of zones 402. While FIG. 4 depicts zones 402a-402c, this is not intended to be limiting on the various embodiments of the present disclosure. For example, the hollow section 202 may include any number of zones 402. Each of the plurality of zones 402 may be individually pressurizable. The individual pressurization of the zones 402 may allow for control of the movement of one or more portions of the hollow section 202 individually or in tandem. In this regard, each zone of the plurality of zones 402 may be selectively actuated by adjustment of the fluid pressure, as described in one or more embodiments of the present disclosure. In this regard, the zones 402 may be transitioned between one or more preset states and/or may be actuated in a continuous manner. The selective actuation of the zones 402 may allow the flexible gripper element 102 to grip an object. Furthermore, each zone 402 (e.g., zones 402a-402c) may include a fluid input 404 (e.g., inputs 404a-404c) configured to fluidically couple to a fluid port. In this regard, the earlier discussion of the fluid input 212 may be applied to the fluid inputs 404a-404c.

FIG. 5 illustrates a side view of a gripper assembly 100, in accordance with one or more embodiments of the present disclosure.

In some embodiments, the gripper assembly 100 may include one or more bridge elements 502. The bridge element may be configured to interconnect two or more flexible gripper elements 102. The bridge element 502 is configured to fluidically couple with one or more of the flexible gripper elements 102. For example, the bridge element 502 may include a fluid input 404 that is fluidically coupled to the hollow section 202 of the flexible gripper element 102. In this regard, as the hollow section 202 of the flexible gripper element 102 receives fluid pressure, so does the bridge element 502.

The bridge element 502 may be flexible. The flexible bridge element 502 may be composed of the same or similar material as the flexible gripper element 102 and may include a fluid input 404, a hollow section 202, and one or more chambers 218. In this regard, the flexible bridge element 502 may be selectively pressurizable. The selective pressurization of the flexible bridge element 502 may assist in reversibly gripping an object by the flexible gripper element 102. For example, as the flexible bridge element 502 is pressurized, the flexible bridge element 502 may expand causing rotation of the flexible gripper element 102 towards the object. The flexible bridge element 502 may be used in combination with any of the other present disclosures, including, but not limited to, a fluid input, a first side portion, a second side portion, a chamber, a protrusion, a rib, a spring, or a plurality of zones with a plurality of fluid inputs. The bridge element 502 is not intended to be limited to the flexible bridge element, unless otherwise noted. For example, a bridge element 502 is generally understood to assist the one or more flexible gripper elements 102 in conforming to or gripping an object. In this regard, the bridge element 502 may include a non-flexible bridge element such as a hard-plastic bridge element.

Figure 6:
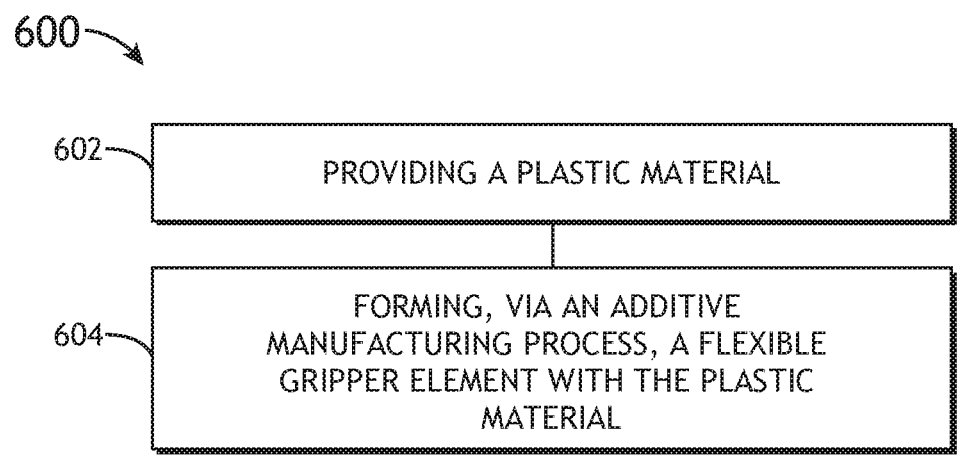
FIG. 6 illustrates a block diagram view of a method of manufacturing a flexible gripper element, in accordance with one or more embodiments of the present disclosure.

FIG. 6 illustrates a block diagram view of a method for manufacturing a flexible gripper element, in accordance with one or more embodiments.

In some embodiments, a flexible gripper element may be formed by a method 600. The method for forming the flexible gripper element may include providing a plastic material 602. The plastic material 602 may include, but is not limited to, polyamides, polycarbonates, polyethylenes, polypropylenes, or thermoplastic polyurethane (TPU). In this regard, the plastic material 602 may be provided as a vat of liquid polymer, as a powder, as a spool, or by any other suitable means. Such plastic material may be formed into the flexible gripper element by an additive manufacturing process 604. The additive manufacturing process may include, but is not limited to, 3D printing, photopolymerization, material jetting, binder jetting, extrusion, powder bed fusion, or directed energy deposition. The additive manufacturing process may form a hollow section, a first side portion, and a second side portion opposite the first side portion. A surface area of the first side portion may be less than the second side portion, in accordance with one or more embodiments of the present disclosure. The flexible gripper element formed by the method 600 may be configured to selectively deform upon receiving fluid flow through the hollow section (e.g., by a fluid input). The additive manufacturing process and the plastic material 602 selected may be based on the ability of the flexible gripper element to elastically deform to grip an object. A further design and/or material consideration may include the ability of the hollow section to be pressurized without bursting.

The method 600 is not intended to be limiting to the various embodiments of the present disclosure. For example, a flexible gripper element may be injection molded as two halves. The two halves of the flexible gripper element may be subsequently joined by a process. The process may include, plastic welding (e.g., hot gas welding, heat sealing, tip welding, contact welding, hot plate welding, infrared welding, high-frequency welding, injection welding, etc.).

Referring generally again to FIGS. 1-6, there may be additional or alternative components included in the gripper assembly 100, other than those expressly described herein.

In some embodiments, the gripper assembly 100 may include bolts and/or fasteners to connect components such as, but not limited to, the mounting platform 104 and the stage 106. Similarly, the gripper assembly 100 may include fluid fittings, valves, tubes, and/or pumps to provide fluid to the hollow section 202 by the fluid input 212 and/or fluid inputs 404a-404c.

In some embodiments, one or more of the gripper assembly 100 or the flexible gripper element 102 may be used on a portable system (e.g., a mobile industrial robot) or a stationary system (e.g., a pick and place robot).

In some embodiments, the flexible gripper element 102 may be composed of a material suitable for elasticity, grip strength, ease of manufacturing, elongation, resisting bursting due to pressure, or any other desirable feature. For example, the flexible gripper element 102 may be composed of an elastomer. By way of another example, the flexible gripper element 102 may be composed of a plastic material (e.g., polyamides, polycarbonates, polyethylenes, polypropylenes, thermoplastic polyurethane, etc.). In this regard, the plastic material may be manufactured by an additive manufacturing technique to form the flexible gripper element 102. The materials disclosed herein are not intended to be limiting on the various embodiments of the present disclosure. Rather, a material selection may be based on such factors including, elasticity, grip strength, ease-of-manufacturing, ability to elongate, and/or ability to resist bursting due to pressure. In this regard, the material selected may withstand a fluid pressure thereby allowing the flexible gripper element 102 to apply a force on the object to be gripped. Additionally, the flexible gripper element 102 may be flexible thereby allowing the gripper assembly 100 to conform to the object to be gripped.

In some embodiments, the flexible gripper element 102 may be manufactured by an additive manufacturing process (e.g., 3D printing, photopolymerization, material jetting, binder jetting, extrusion, powder bed fusion, directed energy deposition). In other embodiments, the flexible gripper element 102 may be injection molded.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

Although particular embodiments of this invention have been illustrated, it is apparent that various modifications and embodiments of the invention may be made by those skilled in the art without departing from the scope and spirit of the foregoing disclosure. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Accordingly, the scope of the invention should be limited only by the claims appended hereto.

What is claimed:

1. A flexible gripping element comprising:
   a hollow section;
   a first end piece disposed at a first end portion of the hollow section;
   a second end piece disposed at a second end portion of the hollow section, wherein the first end portion includes a fluid input and is configured for attachment to a portion of a gripper assembly;
   a first side portion; and
   a second side portion opposite the first side portion, wherein the first side portion has a surface area less than the second side portion,
   wherein the hollow section is configured to selectively receive fluid through the fluid input to adjust pressure within the hollow section and cause the hollow section to selectively actuate, wherein the hollow section includes a plurality of zones, wherein two or more of the plurality of zones are individually pressurizable to individually control movement of two or more portions of the hollow section.

2. The flexible gripping element of claim 1, wherein the hollow section is configured to selectively receive fluid through the fluid input to increase pressure within the hollow section and cause the hollow section to curve toward the first side portion.

3. The flexible gripping element of claim 1, wherein the hollow section is configured to selectively receive fluid through the fluid input to increase pressure within the hollow section and cause the hollow section to actuate from a pre-curved state to a straightened state.

4. The flexible gripping element of claim 3, further comprising a retraction element configured to maintain the hollow section in the pre-curved state prior to pressurization.

5. The flexible gripping element of claim 1, wherein the hollow section includes a plurality of chambers, wherein an external surface of the plurality of chambers causes the second side portion to have a surface area larger than the first side portion.

6. The flexible gripping element of claim 1, further comprising:
   a plurality of ribs disposed within the hollow section, wherein the ribs are configured to inhibit expansion of the hollow section along a dimension of the hollow section.

7. The flexible gripping element of claim 1, wherein the second end piece comprises one or more pliable elements configured to grip one or more objects.

8. The flexible gripping element of claim 7, wherein the one or more pliable elements comprise one or more pliable layers.

9. The flexible gripping element of claim 8, wherein the one or more pliable layers span a selected angle.

10. The flexible gripping element of claim 8, wherein the one or more pliable layers include a material having a coefficient of friction larger than the hollow section.

11. The flexible gripping element of claim 8, wherein the one or more pliable layers are deformable upon contact with the one or more objects.

12. The flexible gripping element of claim 1, wherein at least one of the hollow section, the first end piece, or the second end piece are fabricated via additive manufacturing.

13. The flexible gripping element of claim 1, wherein at least one of the hollow section, the first end piece, or the second end piece are fabricated via injection molding.

14. The flexible gripping element of claim 1, wherein at least one of the hollow section, the first end piece, or the second end piece are composed of one or more plastic materials.

15. The flexible gripping element of claim 1, wherein the fluid comprises at least one of a gas or liquid.

16. The flexible gripping element of claim 14, wherein at least one of the hollow section, the first end piece, or the second end piece are composed of thermoplastic polyurethane (TPU).

17. A gripper assembly comprising:
a plurality of flexible gripper elements;
a plurality of mounting platforms,
wherein a particular flexible gripper element is secured to a particular mounting platform,
wherein the particular mounting platform includes a fluid port for fluidically coupling a fluid source to a fluid input of the particular flexible gripper element,
wherein two or more of the plurality of flexible gripper elements are selectively pressurizable for selectively actuating the two or more of the plurality of flexible gripper elements to reversibly grip an object,
wherein the two or more of the plurality of flexible gripper elements comprise:
a hollow section;
a first end piece disposed at a first end portion of the hollow section;
a second end piece disposed at a second end portion of the hollow section;
a first side portion; and
a second side portion opposite the first side portion, wherein the first side portion has a surface area less than the second side portion,
wherein the hollow section is configured to selectively receive fluid through the fluid input to adjust pressure within the hollow section and cause the hollow section to selectively actuate, wherein the hollow section includes a plurality of zones, wherein two or more of the plurality of zones are individually pressurizable to individually control movement of two or more portions of the hollow section.

18. The gripper assembly of claim 17, further comprising:
one or more sensors for determining one or more characteristics of the object.

19. The gripper assembly of claim 18, wherein the one or more sensors comprise: at least one of an optical sensor, a camera, or a tactile sensor.

20. The gripper assembly of claim 18, further comprising:
a controller configured to control pressurization of the two or more of the plurality of flexible gripper elements to selectively actuate the two or more of the plurality of flexible gripper elements.

21. The gripper assembly of claim 20, wherein the controller is configured to receive information from the one or more sensors and based on the received information adjust one or more conditions of the gripper assembly.

22. The gripper assembly of claim 21, wherein the controller is configured to execute a machine learning algorithm, wherein the machine learning algorithm applies a generated model to the received information from the one or more sensors, wherein the generated model causes the controller to adjust one or more conditions of the gripper assembly based on the received information.

23. The gripper assembly of claim 17, wherein the hollow section is configured to selectively receive the fluid through the fluid input to increase pressure within the hollow section and cause the hollow section to curve toward the first side portion.

24. The gripper assembly of claim 17, wherein the hollow section is configured to selectively receive the fluid through the fluid input to increase pressure within the hollow section and cause the hollow section to actuate from a pre-curved state to a straightened state.

25. The gripper assembly of claim 24, further comprising a retraction element configured to maintain the hollow section in the pre-curved state prior to pressurization.

26. The gripper assembly of claim 17, wherein the second side portion includes a plurality of chambers, wherein an external surface of the plurality of chambers causes the second side portion to have a surface area larger than the first side portion.

27. The gripper assembly of claim 17, wherein the particular flexible gripper element includes a plurality of ribs disposed within the hollow section, wherein the plurality of ribs are configured to inhibit expansion of the hollow section along a dimension of the hollow section.

28. The gripper assembly of claim 17, wherein the second end piece comprises one or more pliable elements configured to grip one or more objects.

29. The gripper assembly of claim 28, wherein the one or more pliable elements comprise one or more pliable layers.

30. The gripper assembly of claim 29, wherein the one or more pliable layers span a selected angle.

31. The gripper assembly of claim 29, wherein the one or more pliable layers include a material having a coefficient of friction larger than the hollow section.

32. The gripper assembly of claim 29, wherein the one or more pliable layers are deformable upon contact with the object.

33. The gripper assembly of claim 17, wherein the two or more of the flexible gripper elements are interconnected, wherein pressure within each of two or more interconnected flexible gripper elements is individually adjustable.

34. The gripper assembly of claim 17, further comprising:
one or more suction cups configured to secure the object.

35. The gripper assembly of claim 34, wherein the one or more suction cups are disposed at a location between the two or more flexible gripper elements.

36. The gripper assembly of claim 17, wherein one or more of the plurality of flexible gripper elements are fabricated via injection molding.

37. The gripper assembly of claim 17, wherein one or more of the plurality of flexible gripper elements are composed of one or more plastic materials.

38. The gripper assembly of claim 37, wherein the one or more of the plurality of flexible gripper elements are composed of thermoplastic polyurethane (TPU).

39. The gripper assembly of claim 17, wherein the fluid comprises at least one of a gas or liquid.

40. A gripper assembly comprising:

a plurality of flexible gripper elements;

one or more flexible bridge elements, wherein the one or more flexible bridge elements are configured to fluidically couple two or more of the plurality of flexible gripper elements;

wherein at least one of one or more of the flexible gripper elements or the one or more flexible bridge elements are selectively pressurizable for reversibly gripping an object with the two or more of the flexible gripper elements, wherein the one or more of the flexible gripper elements comprises:

a hollow section;

a first end piece disposed at a first end of the hollow section;

a second end piece disposed at a second end portion of the hollow section;

a first side portion; and a second side portion opposite the first side portion, wherein the first side portion has a surface area less than the second side portion, wherein the hollow section is configured to selectively receive fluid through a fluid input to adjust pressure within the hollow section and cause the hollow section to selectively actuate, wherein the hollow section includes a plurality of zones, wherein two or more of the plurality of zones are individually pressurizable to control movement of two or more portions of the hollow section.

41. The gripper assembly of claim 40, further comprising:

a controller configured to control pressurization of at least one of one or more of the flexible gripper elements or the one or more flexible bridge elements.

42. A method of forming a flexible gripper element comprising:

providing a plastic material;

forming a flexible gripper element with the plastic material via an additive manufacturing process, wherein the forming the flexible gripper element includes:

forming a hollow section including a plurality of zones;

forming a first side portion and a second side portion opposite the first side portion such that the first side portion has a surface area less than the second side portion, disposing a first end piece at a first end portion of the hollow section; and disposing a second end piece at a second end portion of the hollow section, wherein the first end portion includes a fluid input and is configured for attachment to a portion of a gripper assembly;

wherein the hollow section is configured to selectively receive fluid through the fluid input to adjust pressure within the hollow section and cause the hollow section to selectively actuate, wherein two or more of the plurality of zones are individually pressurizable to individually control movement of two or more portions of the hollow section.

\* \* \* \* \*